(12) United States Patent
Mazzocca et al.

(10) Patent No.: US 10,272,608 B2
(45) Date of Patent: Apr. 30, 2019

(54) EXTRUDER SCREW ELEMENT

(71) Applicants: Compagnie Generale des Etablissements Michelin, Clermont-Ferrand (FR); Michelin Recherche et Technique S.A., Granges-Paccot (CH)

(72) Inventors: Timothy Mazzocca, Ontario (CA); Andrew Hudson, Greenville, SC (US); Michael Brickey, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 0 days.

(21) Appl. No.: 15/508,559

(22) PCT Filed: Sep. 29, 2014

(86) PCT No.: PCT/US2014/058055
§ 371 (c)(1),
(2) Date: Mar. 3, 2017

(87) PCT Pub. No.: WO2016/053240
PCT Pub. Date: Apr. 7, 2016

(65) Prior Publication Data
US 2017/0246787 A1    Aug. 31, 2017

(51) Int. Cl.
*B29B 7/48*        (2006.01)
*B29C 47/08*       (2006.01)
(Continued)

(52) U.S. Cl.
CPC .......... *B29C 47/0844* (2013.01); *B29B 7/482* (2013.01); *B29C 47/082* (2013.01);
(Continued)

(58) Field of Classification Search
CPC .............. B28C 47/082; B28C 47/0825; B28C 47/0844; B28C 47/6043; B28C 47/6075;
(Continued)

(56) References Cited

U.S. PATENT DOCUMENTS 2,581,031 A  *  1/1952  Kruzik ................... B29B 7/401
                                                    241/82.1
3,184,790 A     5/1965  Araki
(Continued)

FOREIGN PATENT DOCUMENTS

DE    27 00750 A1    7/1977
JP    S5557445 A     4/1980
(Continued)

OTHER PUBLICATIONS

PCT Search Report for PCT/US14/58235 dated Jan. 2, 2015.
PCT Search Report for PCT/US2014/058055 dated Feb. 19, 2015.
Korean Patent Office, First Office Action, dated Oct. 12, 2018.

*Primary Examiner* — Abbas Rashid
(74) *Attorney, Agent, or Firm* — Dority & Manning, P.A.

(57) ABSTRACT

A screw element (100) for an extrusion machine is provided. The screw element (100) includes a first section (200) and a second section. The first section (200 has a first core (212) with a plurality of facets (214) connected to each other along splines (216). The facets (214) and splines (216) extend longitudinally along the screw element (100). The facets (214) and splines (216) can be helically-shaped. The first core (212) increases in diameter in a continuous manner along the direction of flow of material. The first and second sections (200, 300) include one or more helically-shaped flights (218,219) wrapped around the longitudinal axis of the screw element (100).

15 Claims, 5 Drawing Sheets

(51) Int. Cl.
*B29C 47/62* (2006.01)
*B29C 47/60* (2006.01)

(52) U.S. Cl.
CPC ...... *B29C 47/0825* (2013.01); *B29C 47/6018* (2013.01); *B29C 47/6081* (2013.01); *B29C 47/627* (2013.01)

(58) Field of Classification Search
CPC ... B28C 47/6081; B28C 47/62; B28C 47/625; B28C 47/627; B28C 47/64; B29B 7/482
USPC .............................................. 366/81, 88, 89
See application file for complete search history.

(56) References Cited

U.S. PATENT DOCUMENTS

| | | | |
|---|---|---|---|
| 3,559,239 A | 2/1971 | Work et al. | |
| 3,734,662 A | 5/1973 | Harmon et al. | |
| 4,131,368 A | 12/1978 | Iddon | |
| 4,752,136 A * | 6/1988 | Colby | B29C 45/60 366/323 |
| 4,963,033 A * | 10/1990 | Huber | B27L 11/08 366/319 |
| 5,033,860 A | 7/1991 | Nakamura | |
| 5,178,458 A * | 1/1993 | Hsu | B29C 47/60 366/89 |
| 5,267,788 A * | 12/1993 | Rockstedt | B29B 7/482 366/301 |
| 5,674,440 A | 10/1997 | Klinedisnt | |
| 6,251,452 B1 | 6/2001 | Weinstein et al. | |
| 8,267,149 B2 | 9/2012 | McCullough | |
| 9,283,617 B2 | 3/2016 | McCullough | |
| 2004/0238995 A1 | 12/2004 | Ulcej | |
| 2004/0257904 A1 | 12/2004 | Zhang et al. | |

FOREIGN PATENT DOCUMENTS

| | | |
|---|---|---|
| JP | 2001062897 A | 3/2001 |
| JP | 2011/083976 | 4/2011 |
| KR | 10-1116667 | 3/2012 |

* cited by examiner

EXTRUDER SCREW ELEMENT

FIELD OF THE INVENTION

The subject matter of the present disclosure relates generally to a screw element of an extrusion machine.

BACKGROUND OF THE INVENTION

An extrusion machine or extruder typically includes a screw element received within a cylindrical sleeve or barrel. The screw element includes one or more flights or threads arranged along the length of the element. The screw element is rotated within the sleeve while material such as e.g., one or more rubbers or plastics are fed into one end of the sleeve. Rotation of the screw element masticates and heats the material while pushing the material through the sleeve. A die plate positioned at the exit of the extruder can be used to impart a particular shape to the material as it passes through one or more openings in the die plate due to the substantial pressure created by rotation of the screw element.

By way of example, in modern processes for the manufacture of tires, the extruder may be used to create a layer of rubber for the tread portion of the tire. The layer of rubber is commonly created from a complex mix of materials fed into the extruder that can include various elastomers, resins, carbon black fillers, non-carbon black fillers, and/or other substances. The extruder functions to process the materials under heat and pressure for use as tread while the die plate provides the desired profile for the extruded tread portion.

One conventional construction for an extruder screw can include one or more flights uniformly spaced along a cylindrical core or screw root. Either a constant or variable pitch is maintained between the flights, and the core maintains a constant or variable diameter of a circular profile along its length. The cylindrical sleeve into which the extruder screw is received may be featureless or may include one or more flutes.

Unfortunately, such conventional extruder screw constructions do not provide the level of processing needed for modern rubber formulations at the rate of flow or throughput of material desired. Difficulties can be encountered in properly masticating, heating, and flowing some rubber formulations within the extruder in a manner that allows the material to be properly shaped with a typical extrusion die at the rate of throughput needed for economical manufacturing. Instead, for example, the overall rate of throughput must typically be slowed substantially in order to obtain the required amount of heat, homogenization, and mastication. A lower rate of throughput is undesirable as it slows the manufacturing process thereby increasing costs.

Accordingly, an extruder having improved performance capabilities would be useful. More particularly, an extruder screw capable of providing the desired level of material processing at an acceptable rate of throughput of the material would be beneficial. Such an extruder screw that can perform with modern rubber formulations would also be particularly useful.

SUMMARY OF THE INVENTION

The present invention relates to an extrusion machine and, more particularly, to a screw element used in an extrusion machine. The screw element includes a first section and a second section. The first section has a first core with a plurality of facets connected to each other along splines. The facets and splines extend longitudinally along the screw element. The facets and splines can be helically-shaped. The first core increases in diameter along the direction of flow of material. The first and second sections include one or more helically-shaped flights wrapped around the longitudinal axis of the screw element.

The facets and splines provide a polygonal cross-sectional shape for the first section that, during rotation of the screw element, creates a rapid, successive series of compression and decompression cycles of material processed by the extrusion machine. As such, the present invention provides an extruder screw that can advantageously provide the desired level of processing, including heating, homogenization, and mastication of the material, at higher rates of throughput as compared to certain conventional extrusion machines. Furthermore, such advantageous processing can be achieved by retrofitting an existing extrusion machine with the inventive screw element rather than replacing the entire machine with higher-cost, alternate extrusion technology known to those skilled in the art. Additional objects and advantages of the invention will be set forth in part in the following description, or may be apparent from the description, or may be learned through practice of the invention.

In one exemplary embodiment, the present invention provides an extrusion machine that includes a screw element. The screw element defines longitudinal, circumferential, and radial directions wherein the longitudinal direction is defined along the axial length of the screw element. The screw element includes a first section and a second section positioned sequentially along the longitudinal direction.

The first section includes a first core having a plurality of facets positioned adjacent to each along the circumferential direction. Each facet extends longitudinally over the first section. Each facet is joined to an adjacent facet along splines extending longitudinally over the first section. The first core has a diameter that increases continuously along the longitudinal direction towards the second section.

A first helically-shaped flight is wrapped around the first core of the screw element. The first helically-shaped flight extends longitudinally over the first section and projects radially outward of the plurality of facets.

The second section includes a second core extending along the longitudinal direction and having a cylindrically-shaped surface. A second helically-shaped screw flight is wrapped around the second core of the screw element. The second helically-shaped flight extends longitudinally over the second section and projects radially outward from the second core.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Figure 1:
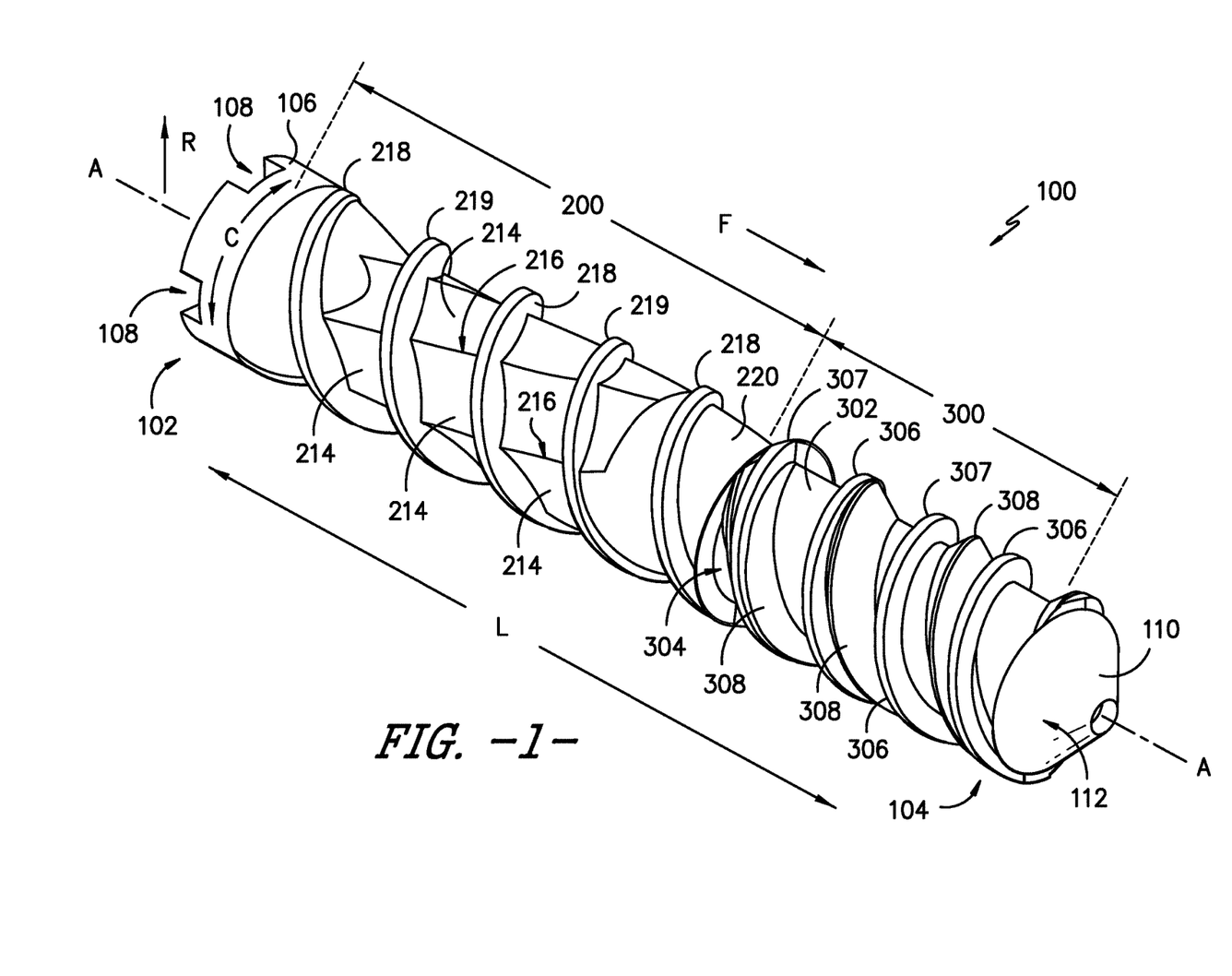
FIG. 1 illustrates a perspective view of an exemplary embodiment of a screw element or extruder screw of the present invention.
Figure 2:
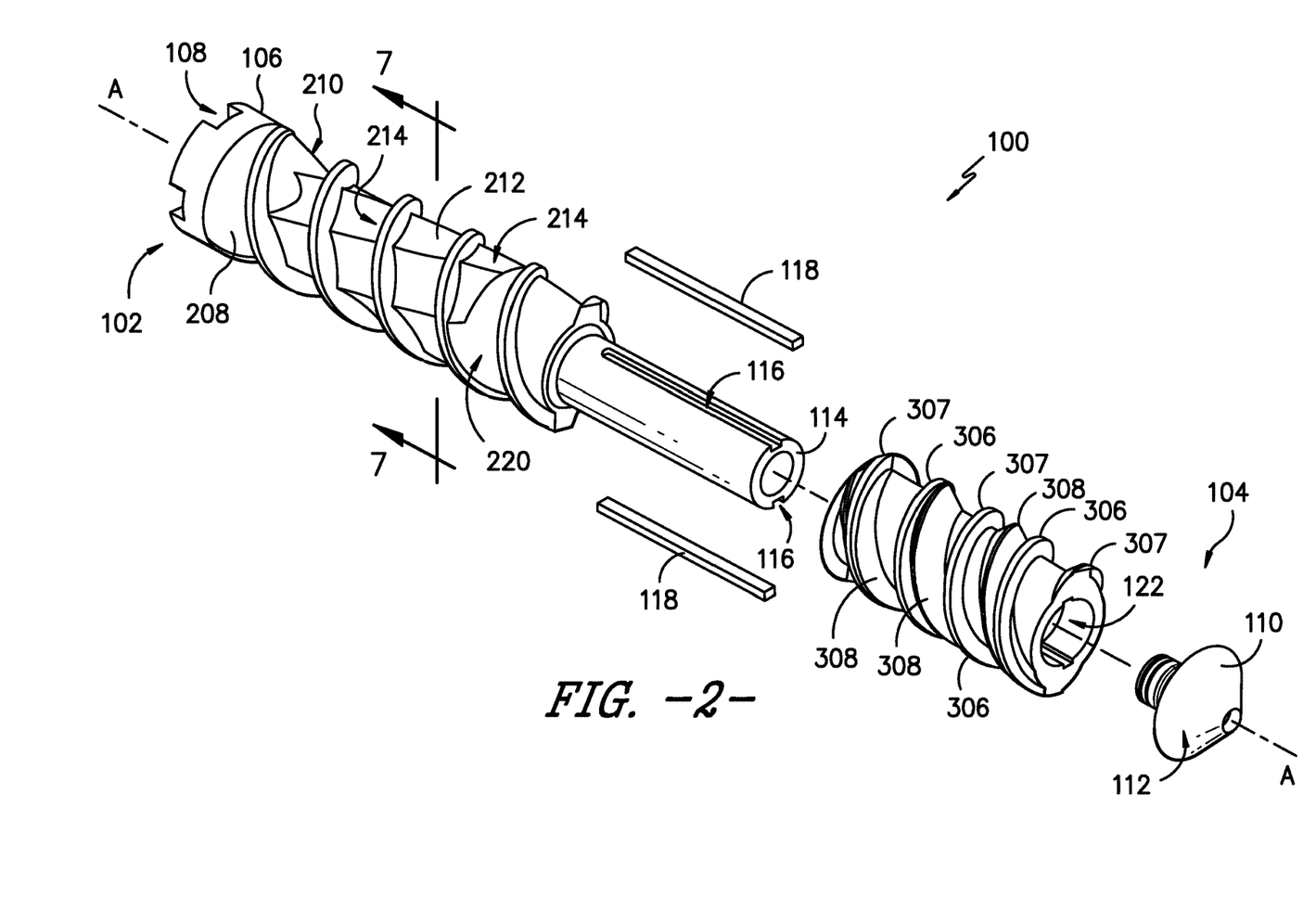
FIG. 2 is an exploded view of the exemplary screw element of FIG. 1.

FIG. 1 provides a perspective view of an exemplary screw element 100 of an extrusion machine while FIG. 2 provides an exploded view of the same. Screw element 100 defines a longitudinal direction L and a radial direction R, which is orthogonal to longitudinal direction L. Screw element 100 also defines a circumferential direction C, which encircles longitudinal axis A-A about which screw element 100 rotates during use. More particularly, screw element 100 is rotated about axis A-A within an extruder barrel or cylinder (not shown) of an extrusion machine. The rotation of screw element 100 causes an overall movement of material in the direction of arrow F, which is parallel to longitudinal direction L and longitudinal axis A-A.

Screw element 100 includes a first section 200 and a second section 300. In terms of the extrusion process direction F, which represents the overall flow of material along element 100, first section 200 and second section 300 are positioned adjacent to each other with second section 300 sequentially following (or e.g., downstream of) the first section 200. Sections 200 and 300 are located between an in-feed end 102 and an out-feed end 104. Material to be processed by screw element 100 is introduced near the in-feed end 102 and, after processing by screw element 100, the material exits near out-feed end 104.

For this exemplary embodiment, screw element 100 can be assembled by sliding second section 300 onto spindle 114 and securing it into place by keys 118 received in slots 116. Screw element 100 includes a connecting hub 106 with notches 108 for connection with a motor or drive shaft for rotating screw element 100. Out-feed end 104 includes an exit cone 110 with a frustoconical surface 112. As shown in FIGS. 2 and 5, exit cone 110 includes a boss 124 with threads 120 that are matingly received into an opening 122 in spindle 114 near out-feed end 104. Grooves 126 on boss 124 receive seals such as e.g., O-rings to prevent migration of cooling water out of the internal chamber 128 (FIG. 3) of screw element 100 into the extrusion process volume formed in the space between the screw and the surrounding barrel sleeve.

The present invention is not limited to a multi-piece design for screw element 100 as shown in FIG. 2. For example, screw element 100 may be constructed of a single piece or element that includes all sections as well as the exit cone. Other configurations may be used as well.

Figure 3:
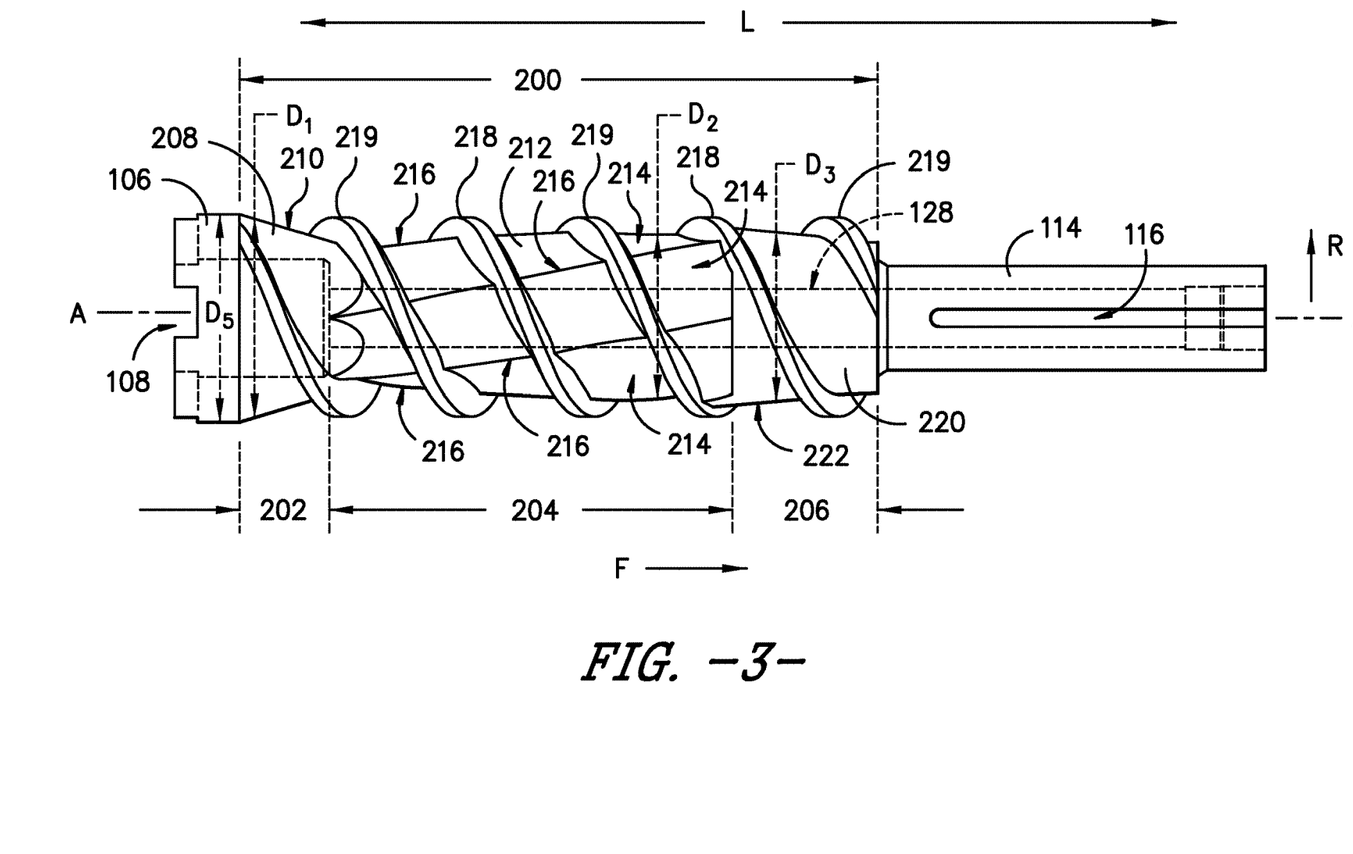
FIG. 3 is a side view of a portion of the exemplary screw element of FIG. 1, including an exemplary first section.
Figures 4, 5:
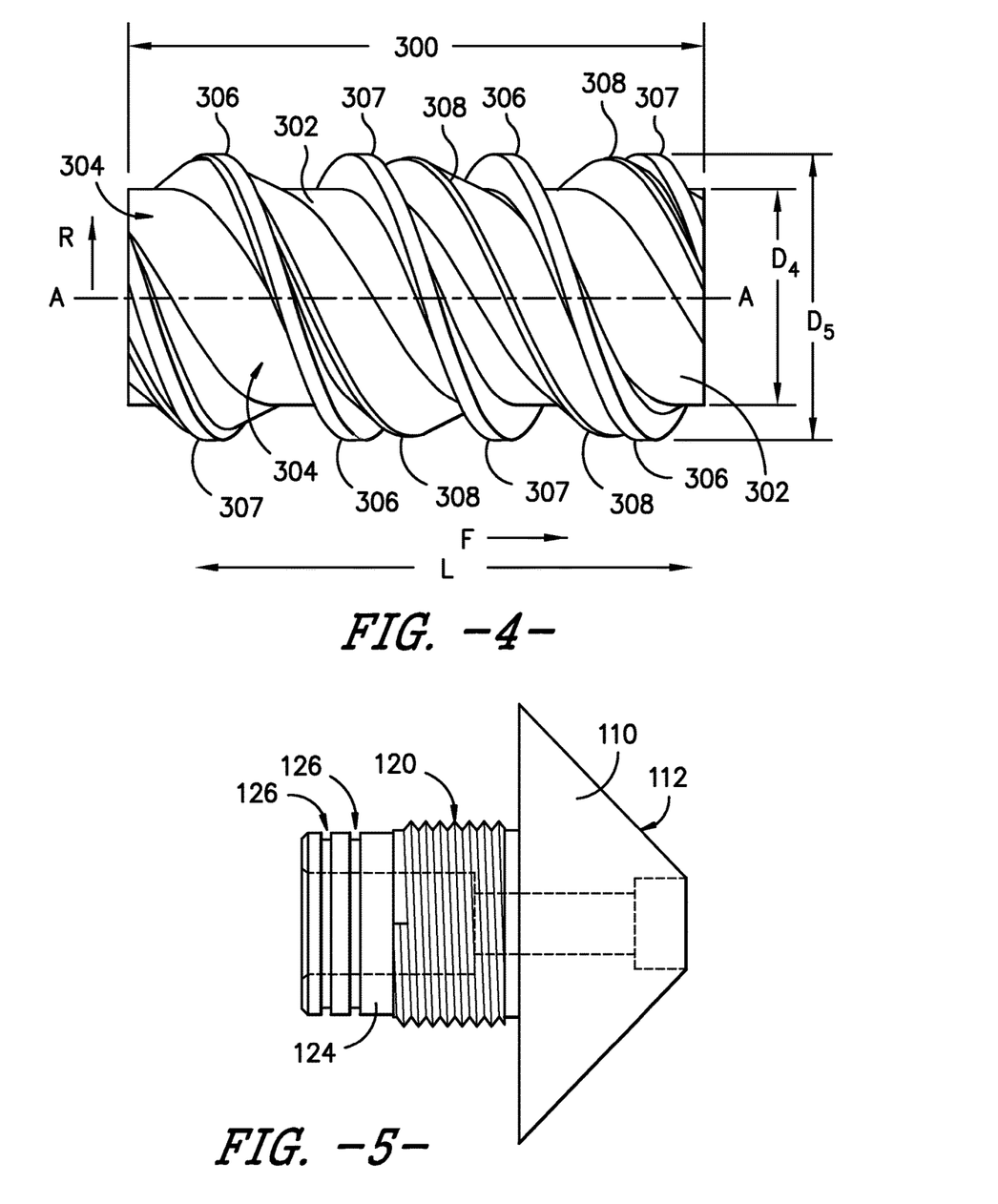
FIG. 4 is a side view of a portion of the exemplary screw element of FIG. 1, including an exemplary second section.
FIG. 5 is a side view of an exemplary exit cone for the exemplary screw element of FIG. 1.

Referring now to the side view provided in FIG. 3, along the direction of flow F, first section 200 sequentially includes a preliminary core section 202, a faceted first core section 204, and a spacer core section 206. Sections 202, 204, and 206 each extend along longitudinal direction L and are positioned adjacent to each other along longitudinal direction L.

In terms of the direction of overall flow F of material, preliminary core section 202 precedes first core section 204. Preliminary core section 202 includes a preliminary core 208 having a frustoconical surface 210. The diameter $D_1$ of preliminary core 208 decreases in the direction of flow F towards first core section 204.

Next, first core section 204 includes a first core 212 having a plurality of facets 214. As shown in FIGS. 1, 2, and 3, facets 214 are positioned adjacent to each other about the circumferential direction C (identified in FIG. 1). Each facet 214 is joined to adjacent facets 214 along splines 216, which also extend along longitudinal direction L. For this exemplary embodiment, each facet 214 and spline 216 extends along longitudinal direction L for a length that provides over half of the overall length of first section 200 along longitudinal direction L.

Figure 7:
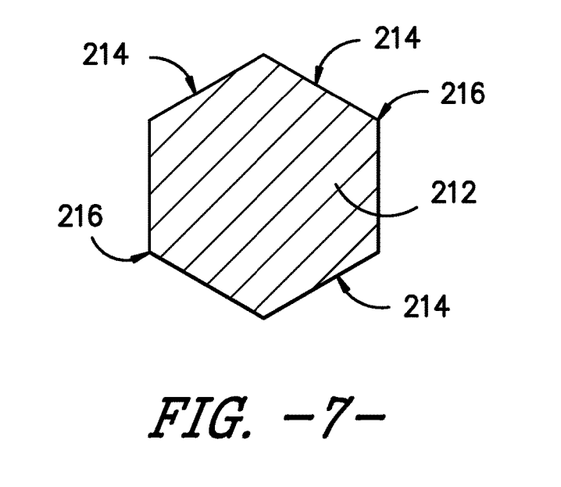
FIG. 7 is a cross-sectional view of the exemplary first section taken along line 7-7 of FIG. 2.

FIG. 7 provides a schematic cross-sectional view, taken along line 7-7 of FIG. 2, of screw element 100. For purposes of additional clarity, helically-shaped screw flights 218 and 219 are not shown. As depicted in FIG. 7, the cross-sectional shape of screw element 100 (as viewed along a cross-section that is orthogonal to the longitudinal direction) is polygonal. Although shown in FIG. 7 as formed from a polygon having six flat sides 214 formed by facets 214, other polygons may be used as well. For example, polygons having 5, 6, 7, or 8 sides 214 formed from facets 214 may be used and are believed to optimize the processing provided by screw element 100. With less than 5 sides, the mechanical strength of the first section can be insufficient while more than 8 sides can unacceptably decrease pulsating effect of the facets.

As best viewed in FIG. 3, first core 212 has a diameter $D_2$ that increases in a continuous manner along longitudinal direction L so as to provide for increased compression of material as it flows along direction F. As used herein, "continuous" means that diameter $D_2$ changes along longitudinal direction L but without sudden or step-wise changes in diameter. Diameter $D_2$ refers to the diameter of the core 212 and does not include the flights. The amount of increase, which can be quantified using a "compression ratio," allows the present invention to advantageously provide for the selective control of the degree of rubber compression by first section 200. In one exemplary embodiment of the invention, the increasing diameter $D_2$ provides the faceted first core section 204 with a compression ratio in the range of about 18 percent to 25 percent. In another exemplary embodiment of the invention, increasing diameter $D_2$ provides the faceted first core section 204 with a compression ratio of about 22 percent. Other compression ratios may be used as well depending upon e.g., the identity of the material extruded and the level of processing desired. As used herein, compression ratio means the percent increase in diameter $D_2$ along longitudinal direction L, which can be calculated from the following equation that is well known in the art:

Compression Ratio=Channel Volume of Second Section 300÷Channel Volume of First Section 200    Equation 1:

where

Channel Volume of Second Section 300=the volume enclosed between core 306, flights 306, flights 307, flights 308, and the extruder shell in section 300

Channel Volume of First Section 200=the volume enclosed between core 214, flights 218, flights 219 and the extruder shell in section 200

Continuing with FIG. 3, first section 200 can include a space core section 206, which follows faceted first core section 204 along flow direction F. Spacer core section 206 includes a spacer core 220 having a frustoconical surface 222. For this exemplary embodiment, the diameter $D_3$ of spacer core 220 decreases in the direction of flow F towards second section 300.

In other exemplary embodiments of the present invention, spacer core section 206 and/or preliminary core section 202 may not be included as such are not necessarily required to obtain the improved performance characteristics of the present invention. However, spacer core section 206 and/or preliminary core section 202 may be useful in retrofitting an existing extrusion machine with an exemplary screw element of the present invention.

First section 200 also includes a first helically-shaped screw flight 218 that is wrapped around first core 212 and longitudinal axis L of screw element 100. For this exemplary embodiment, flight 218 extends longitudinally over the entirety of first section 200 including preliminary core section 202, faceted first core section 204, and spacer core section 206. Flight 218 forms a helical shape as shown and extends along radial direction R outward from the plurality of facets 214. As such, the space enclosed between flight 218, core 212, and the surrounding extruder barrel (not shown) creates a pathway or channel for fostering the movement of material through the extrusion machine along screw element 100. Although not required, first section 200 can also include a supplemental first helically-shaped flight 219 that is also wrapped around first core 212 and extends along longitudinal axis L of screw element 100. For this exemplary embodiment, portions of flights 218 and 219 are parallel to each other over the length of first section 200.

Splines 216 in first section 200 provide additional structural reinforcement—particularly torsional strength—for first core 212 as compared to a conventional, circular core. Additionally, splines 216 provide additional mechanical support to flights 218 and 219. This is advantageous over conventional screw designs having a circular core because in cold-fed rubber extruders, the flights are susceptible to fatigue failure.

FIG. 4 provides a side view of the second section 300 of screw element 100. Second section 300 includes a second core 302 extending along longitudinal direction L and having a cylindrically-shaped surface 304. For this exemplary embodiment, second core 302 has a diameter $D_4$ that is substantially uniform over the length of core 302 along longitudinal axis A-A. By way of example, the length of section 300 is at least twice the size of the nominal screw diameter $D_5$ for certain embodiments.

A second helically-shaped flight 306 is wrapped around second core 302 and longitudinal axis A-A, and extends longitudinally over second section 300. Flight 306 extends radially outward from second core 302. The second helically shaped flights 306 may have a different pitch along longitudinal direction L, than flights 218 and 219—as illustrated in FIG. 1.

For the exemplary embodiment shown in the figures, flights 218 and 300 are discrete elements of first section 200 and second section 300. In other exemplary embodiments of the invention, first helically-shaped flight 218 and second helically shaped flight 306 are joined or integrally formed over the length of first section 200 and second section 300 along longitudinal direction L so as to form a continuous flight.

Similar to section 200, second section 300 may also include a supplemental second helically-shaped flight 307 that is wrapped around second core 302 and longitudinal axis A-A, and extends longitudinally over second section 300. Supplemental flight 306 extends radially outward from second core 302. For this exemplary embodiment, portions of flights 306 and 307 are parallel to each other over the length of second section 300.

For this exemplary embodiment, second section 300 also includes a third helically-shaped flight 308. As with flights 306 and 307, third helically-shaped flights 308 are wrapped around second core 302 and longitudinal axis A-A, and extend along the longitudinal direction L. Flight 308 is divided into segments by flights 306 and 307, and is located between flights 306 and 307 along longitudinal direction L. As compared to flights 306 and 307, flight 308 has a slight difference in height along radial direction R. More particularly, flights 306 and 307 are taller—i.e. extend further outward along radial direction R than third helically—shaped flight 308. In one exemplary embodiment, flights 306 and 308 have a difference in height along radial direction R in the range of about 0.5 mm to 3 mm.

Referring now to FIGS. 1, 2, and 3, the present invention provides additional advantages over conventional devices, some of which can be further described with reference to exemplary extruder screw 100. For example, as previously described, the faceted first core section 204 lacks the conventional round or circular cross-section of a conventional extruder screw. Instead, the polygonal shape created by facets 214 and joined at splines 216 forces the process material against the wall of the surrounding barrel (not shown) in a shearing movement as the screw rotates relative to the stationary barrel. The mastication of the process material therefore occurs in a pulsating manner, which can be described as rapid compression and decompression of open volume between the screw flights and the barrel as each spline 216 of the polygonal shape from a facet to the adjacent one 214 rotates with respect to the stationary barrel.

For a rubber material, such pulsating pressurization and shear experience provides desirable molecular chain scission of the material. Typically, high compression is not desirable near the in-feed end of an extruder screw because it could risk to overheat the material. Where such material is e.g., a rubber formulation, such overheating can lead to premature thermally induced chemical cross-linking known to those skilled in the art as curing. By performing high compression in a pulsating manner as provided by the present invention, the rubber material will undergo sudden shear and scission followed by rapid decompression, which allows the rubber material to relax and dissipate heat. Such heat dissipation is advantageous to avoiding premature curing of the rubber while also allowing for increased rates of flow or throughput for the extruder machine. Additionally, while not wishing to be bound by any particular theory, it is believed that the ability of the rubber material to flow through second section 300 is substantially improved by the pulsing mastication behavior that occurs in first section 200 using the faceted design for first core 212.

For the exemplary embodiment depicted in the figures, facets 214 and splines 216 are helically-shaped along the longitudinal direction L of screw element 100. Stated alternatively, first core section 204 includes a helical twist along the longitudinal axis A-A. In another advantage of the present invention, the amount of twist—i.e. the angle of splines 216 relative to the longitudinal direction L—can be used to selectively promote or retard the flow F of material along longitudinal direction L as the material is driven along by flights 218.

Figure 6:
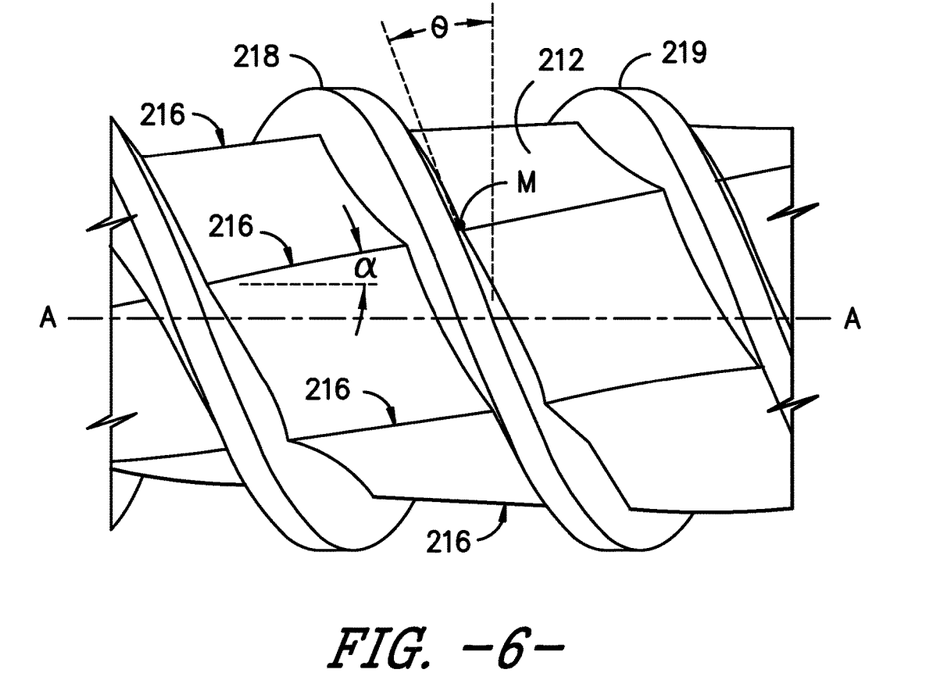
FIG. 6 is a close-up view of the exemplary first section shown in FIGS. 1 and 3.

Referring now to FIG. 6, angle α represents the angle of a spine 216 relative to longitudinal axis A-A. Where angle α is a positive number as illustrated in FIG. 6 between zero and +90 degrees, the polygonal shape of first core 212 will help flights 218 retard the material forward flow while masticating the material relative to flight 218 which promotes flow in the extrusion process direction F. Conversely, where angle α is a negative number between zero and −90 degrees, the polygonal shape of first core 212 will promote forward movement of the material in the extrusion process direction F supplementing the flow behavior generated by flights 218.

Accordingly, angle α allows the design extruder screw element 100 to be tuned for a particular material such as a rubber mix having a particular rheology. In one exemplary embodiment, angle α has a value in the range of zero degrees to +25 degrees or, in another exemplary embodiment, angle α is about +15 degrees. In another exemplary embodiment, angle α has a value in the range of zero degrees to −25 degrees or, in another exemplary embodiment, angle α is about −15 degrees.

Continuing with FIG. 6, for any point M along a radially outermost edge of flight 218, angle θ represents the angle between the tangent to screw flight 218 at point M and a plane P normal to the longitudinal direction L or axis A-A at point M. Angle θ, known to those skilled in the art as the helix angle, provides another variable for controlling the level of material processing and throughput rate through first section 200. In one particular embodiment, angle θ has a value in the range of 55 degrees to 65 degrees. In another exemplary embodiment, angle θ has a value of about 60 degrees.

Another advantage of the present invention is that the inventive screw element can be readily used for retrofitting existing extrusion machines rather than replacing the entire machine. More particularly, performance improvements can be obtained by replacing a conventional screw element with the inventive screw element described and claimed herein. By way of example, an exemplary embodiment of the inventive screw element was used to retrofit an existing extruder having a 200 mm outside diameter and a 5.5 length to diameter ratio. Trials of the inventive screw element, wherein compared to a conventional screw element for the same rubber mix and screw speed, resulted in extrudate temperatures that were 20° C. to 44° C. higher without causing premature curing. It was also observed that the rubber extrudate material had improved geometric shape conformity as well as improved flowability through the extrusion die. Additionally, the inventive screw element is able to provide improved results over a wider range of rubber formulations (i.e. differing amounts and types of fillers, plasticizers, elastomer molecular weights, and resins) than experienced with conventional designs.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An extrusion machine defining a flow direction for material through the machine, the extrusion machine comprising:
  a screw element defining longitudinal, circumferential, and radial directions, the screw element comprising a first section and a second section positioned sequentially along the longitudinal direction, the second section being downstream of the first section along the flow direction;
  the first section comprising
    a first core including a plurality of facets positioned adjacent to each other in the circumferential direction, each facet extending in the longitudinal direction over the first section, each facet joined to an adjacent facet along non-intersecting splines extending longitudinally over the first section, wherein the first core has a diameter that increases in a continuous manner along the longitudinal direction towards the second section;
    a first helically-shaped screw flight wrapped around the first core of the screw element, the first helically-shaped flight extending longitudinally over the first section and projecting radially outward of the plurality of facets;
  the second section comprising
    a second core extending along the longitudinal direction and having a cylindrically-shaped surface; and
    a second helically-shaped screw flight wrapped around the second core of the screw element, the second helically-shaped flight extending longitudinally over the second section and projecting radially outward from the second core;
  wherein the first section further comprises a spacer core positioned between the first core and the second core, the spacer core extending along the longitudinal direction and forming a frustoconical surface that decreases in diameter towards the second core.

2. The extrusion machine of claim 1, wherein the first section further comprises a preliminary core positioned before the first core, the preliminary core extending along the longitudinal direction and forming a frustoconical surface that decreases in diameter towards the first core.

3. The extrusion machine of claim 2, wherein the screw element defines a functional length along the longitudinal direction that consists of the first section and the second section, wherein the preliminary core and the first core together have an overall length that is ⅔ of the functional length of the screw element.

4. The extrusion machine as in claim 1, wherein the second section further comprises a third helically-shaped flight wrapped around the longitudinal axis and extending along the longitudinal direction, the third helically-shaped flight divided into segments positioned between the second helically-shaped flight, wherein the second helically-shaped flight extends further outward along the radial direction than the third helically-shaped flight.

5. The extrusion machine as in claim 1, wherein the first core has a cross-section orthogonal to the longitudinal direction that is shaped as a polygon having 5, 6, 7, or 8 sides.

6. The extrusion machine as in claim 1, wherein the first section has a compression ratio in the range of 18 percent to 25 percent.

7. The extrusion machine as in claim 6, wherein the first section has a compression ratio of 22 percent.

8. The extrusion machine as in claim 1, wherein the first helically-shaped screw flight forms an angle θ from the radial direction in the range of 55 degrees to 65 degrees.

9. The extrusion machine as in claim 1, wherein the second core has a diameter that is substantially uniform along the longitudinal axis.

10. The extrusion machine as in claim 1, wherein the splines and facets are helically-shaped along the longitudinal direction of the screw element.

11. The extrusion machine of claim 10, wherein the splines form an angle α from the longitudinal direction that is in the range of 0 degrees to +25 degrees.

12. The extrusion machine of claim 10, wherein the splines form an angle α from the longitudinal direction that is in the range of 0 degrees to −25 degrees.

13. The extrusion machine of claim 10, wherein the splines form an angle α from the longitudinal direction of 1-15 degrees.

14. The extrusion machine of claim 10, wherein the splines form an angle α from the longitudinal direction of −15 degrees.

15. An extrusion machine, comprising:
a screw element defining longitudinal, circumferential, and radial directions, the screw element comprising a first section and a second section positioned sequentially along the longitudinal direction;
the first section comprising
a first core including a plurality of facets positioned adjacent to each other in the circumferential direction, each facet extending in the longitudinal direction over the first section, each facet joined to an adjacent facet along non-intersecting splines extending longitudinally over the first section, wherein the first core has a diameter that increases in a continuous manner along the longitudinal direction towards the second section;
a first helically-shaped screw flight wrapped around the first core of the screw element, the first helically-shaped flight extending longitudinally over the first section and projecting radially outward of the plurality of facets;
the second section comprising
a second core extending along the longitudinal direction and having a cylindrically-shaped surface; and
a second helically-shaped screw flight wrapped around the second core of the screw element, the second helically-shaped flight extending longitudinally over the second section and projecting radially outward from the second core; a spacer core positioned between the first core and the second core;
wherein the spacer core extends along the longitudinal direction and forms a frustoconical surface that decreases in diameter towards the second core.

* * * * *